Figure 1:
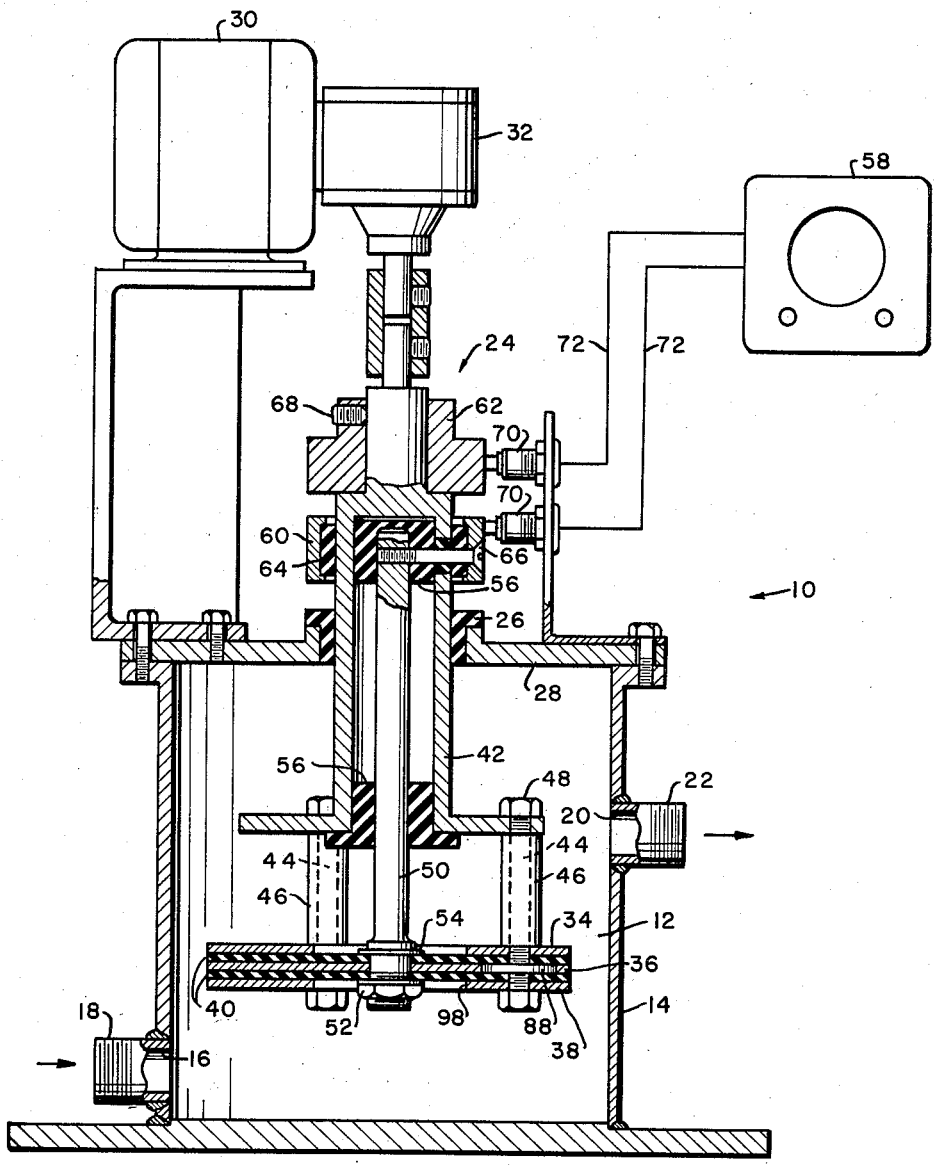

Aug. 19, 1958 H. R. ROLFE 2,848,667
ROTARY CAPACITANCE CELL
Filed May 7, 1956 2 Sheets-Sheet 1

INVENTOR:
HUGH ROYDEN ROLFE
BY
HIS ATTORNEY

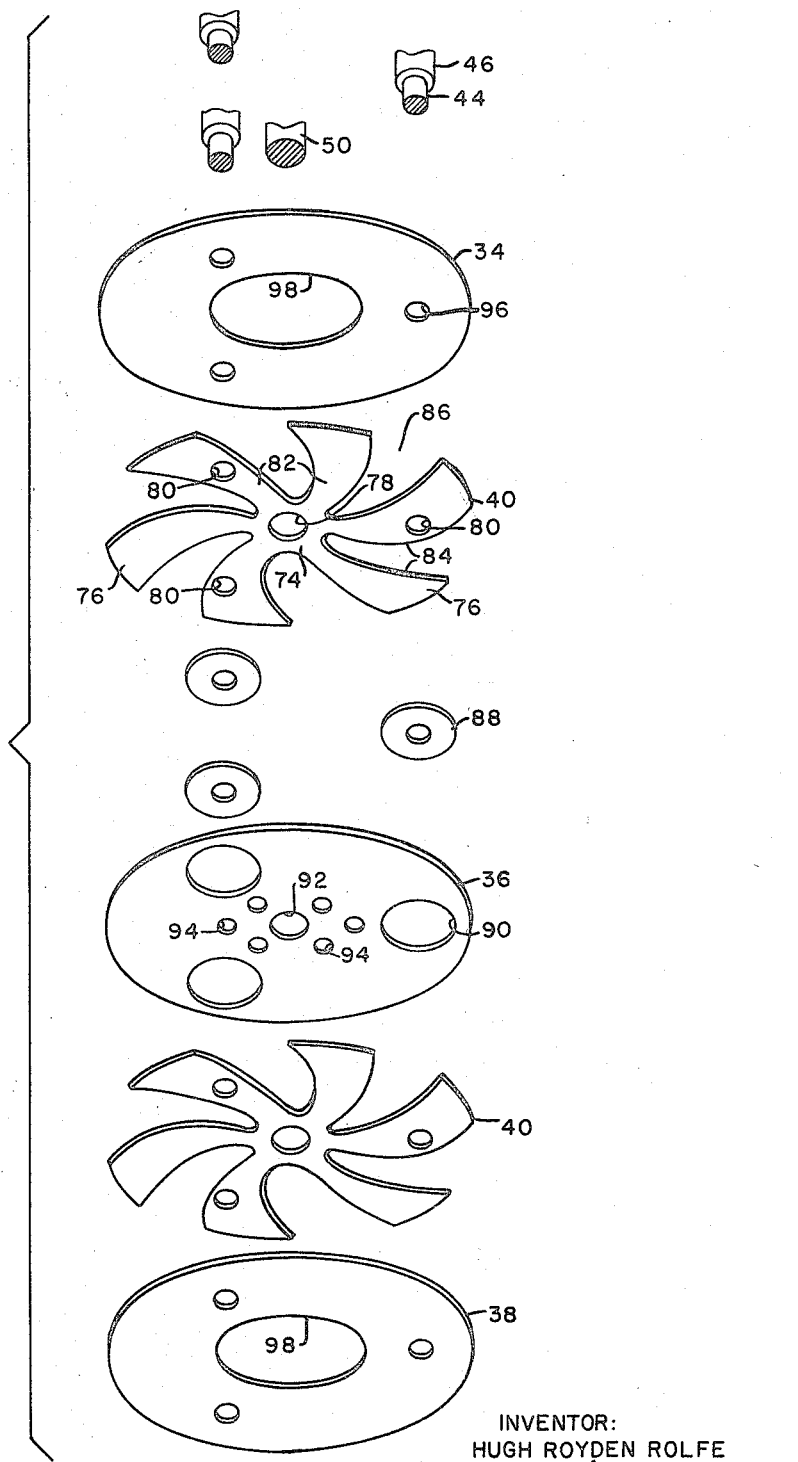

2,848,667
ROTARY CAPACITANCE CELL

Hugh Royden Rolfe, Brooklands, Manchester, England, assignor to Shell Development Company, New York, N. Y., a corporation of Delaware Application May 7, 1956, Serial No. 582,990

Claims priority, application Great Britain May 12, 1955

4 Claims. (Cl. 317—246)

The present invention pertains to capacitance cells and relates more particularly to a new improved capacitance cell for measuring variations in or for determining the dielectric constant of fluids.

The dielectric constant of a fluid can be determined by filling the space between the plates of a condenser with a sample of the fluid, applying a voltage across the plates, and measuring the capacitance of the condenser. Since the capacitance of the condenser varies according to the properties of the dielectric or the fluid between the plates, the dielectric constant of the fluid can readily be ascertained by relating the capacitance of the condenser with the fluid as the dielectric to the capacitance of the condenser with a fluid of known dielectric constant, such for example, as air which has been given the dielectric constant of unity as a standard.

Also, the plates of a condenser can be arranged to permit a continuous flow of fluid between them. Thus, the capacitance can be measured continuously or at intervals for detecting variations in the dielectric constant of a fluid stream, which variations indicate the presence of foreign matter or other fluids in the fluid being tested. For example, where it is desired to provide a dry oil of a certain quality, such an arrangement can be used to detect the presence and the relative amounts of water, or foreign matter in a flow stream of the oil.

However, the condensers used heretofore have not operated satisfactorily. It has been found that after a period of operation, the measurements frequently become unreliable due to the collection of matter on the surfaces of the plates or probes of the condensers. For example, in detecting the presence of water in a stream of a fluid with which it is immiscible, such as oil, globules of water tend to adhere to the surfaces of the condenser plates or probes and distort the measurements for considerable periods of time. Likewise, air bubbles and other foreign matter entrained in the dielectric fluid tend to adhere to the condenser and similarly affect the measurements. These conditions are particularly undesirable when the condenser is used for monitoring a flow stream of fluid.

Accordingly, it is an object of the present invention to provide a new and improved capacitance cell including a condenser constructed and arranged to overcome the above noted and other deficiencies.

Another object is to provide a new and improved condenser which may be used in a closed receptacle with selected samples of a fluid, or which may be readily adapted for detecting variations in the dielectric constant of a flow stream of fluid.

In accordance with one embodiment of the present invention there is provided: a conduit through which a flow stream may be established, a condenser including a number of plates spaced along a single axis in the path of the flow stream and adapted to rotate about said axis, spacers of special construction arranged between the plates, and means for measuring the capacitance of the condenser, the construction and arrangement of the apparatus being such that fluid in the flow stream is drawn into spaces between the plates while the capacitance of the condenser is measured, the fluid being thence ejected from between the plates in a manner preventing the collection of matter on the surfaces of the plates.

These and other objects and advantages of the present invention will be apparent from the following description taken together with the accompanying drawings wherein:

Fig. 1 is a view in vertical section of the apparatus of the present invention, and Fig. 2 is an exploded perspective view of a preferred embodiment of the electrode arrangement of the condenser.

Referring to the drawings, the preferred embodiment of the capacitance cell 10 of the present invention includes a testing chamber 12 provided in a conduit or casing 14 through which a flow stream of fluid may be established between a lower intake port 16 and nipple 18, and an upper discharge port 20 and nipple 22. Axially disposed in the chamber is the lower portion of a rotatable spindle structure 24, the upper portion of which extends through a suitable insulated bushing or bearing and seal 26 in a cap 28 forming the top of the chamber. As diagrammatically shown in Fig. 1, any suitable means may be coupled to the upper end of the spindle structure 24 for rotating it in a desired direction, such as for example, a variable speed electric motor 30 coupled to a speed reducing device 32. The motor and speed reducing device may be supported independently of the casing or may be mounted on the cap, as illustrated.

The spindle structure 24 supports a rotatable condenser, the plates or electrode structure of which is carried by the lower end of the spindle structure and is arranged for rotation therewith in the path of the flow stream.

The electrode structure embodies three circular conductive plates 34, 36, and 38 made of a suitable metal, such as stainless steel. These plates are equally spaced apart by a pair of non-conducting planar spacers or spiders 40 made of a suitable insulating material, such as polytetrafluoroethylene. As shown in Fig. 1, the upper and lower plates 34 and 38 are electrically connected to a flange of a metal cylindrical sleeve 42 of the spindle structure by three triangularly spaced metal bolts 44 (two of which are shown). Each bolt extends through suitable openings in the plates and spiders, through a cylindrical spacer 46 and an opening in the flange for receiving a nut 48 whereby the electrode structure is tightly secured in a fixed position to the flange.

The center plate 36 is electrically connected to a metal central spindle member 50. The lower end of the member 50 extends through center openings in the plates and spiders and threadably receives a nut 52 whereby the center portion of the electrode structure is held in an axially fixed position against a collar 54 on the spindle member 50.

As is subsequently more fully described, the construction of the electrode structure is such that the upper and lower plates 34 and 38 are insulated from the central spindle member 50 and the center plate 36 is insulated from the sleeve 42. Also, the central spindle member is insulated from the sleeve 42 by upper and lower insulated collars 56 which are arranged within the sleeve 42. Thus, the central spindle member 50 and sleeve 42 form two conductors electrically connected to the center plate 36 and the upper and lower plates 34 and 38, respectively, whereby a voltage may be applied across the plates for measuring the capacitance of the condenser.

The spindle member 50 and the sleeve 42 are electrically connected to a unit 58, including a source of E. M. F. for energizing the plates and a measuring circuit or bridge such, for example, as a Schering bridge for measuring the capacitance therebetween. The connecting means may comprise a pair of slip rings 60 and 62 arranged externally of the testing chamber 12. As shown in Fig. 1, the slip ring 60 is separated from the sleeve 42 by an insulated collar 64 and electrical contact is established between the slip ring and the spindle member 50 by a metal screw 66 which extends through the collar and an insulated washer in the metal sleeve 42. The slip ring 62 is arranged on an upper extension of the sleeve 42 and is held in electrical contact therewith by a set screw 68. Any suitable brush type contacts 70 may be connected between the slip rings and a pair of conductors 72 leading to the recorder unit 58.

In order to ensure that the accuracy of the capacitance cell 10 is not impaired by the collection of matter on the plates, the present invention provides a novel construction whereby fluid and other matter in the spaces between the condenser plates is rapidly ejected therefrom during operation of the capacitance cell.

More particularly, as shown in Fig. 2, the spiders 40, which are similarly constructed, each include a central hub section 74 having a plurality of radially extending legs 76. The hub 74 has an opening 78 for the lower end of the spindle member 50, and alternate legs 40 have openings 80 for the bolts 44. Each leg is formed with a base portion 82 of a reduced width, the width of the leg gradually increasing from the hub in the direction of the outer end of the leg. Also, the side edges 84 of each leg are curved slightly, for example, in a counterclockwise direction, as viewed from the lower end of the spindle structure shown in Fig. 1. Thus, the arrangement is such that the fluid receiving spaces 86 defined by the legs also gradually increase in width from the hub in the direction of the outer edge of the spider and are curved slightly in a reverse direction with respect to the normal clockwise direction of rotation of the condenser.

The center plate 36 is insulated from the bolts 44 and thus from the spindle sleeve 42 by the use of three apertured insulating washers 88 through which the bolts pass, the washers being received in suitable openings 90 in the center plate. The center plate is electrically connected to the lower end of the central spindle member 50 which extends through a central opening 92 in the plate in electric engagement with the sides thereof. Also, the center plate is provided with six holes 94 which are arranged in a circle about the central opening 92, each of the holes 94 establishing communication between the fluid receiving spaces 86 on opposite sides of the center plate.

The upper and lower plates 34 and 38 are similar and are each provided with three holes 96 for snugly receiving the bolts 44 whereby the plates are electrically connected to the spindle sleeve 42. Each of the plates is insulated from the central spindle member 50 by an enlarged central opening 98 through which the lower end of the member 50 freely extends, the central opening having a diameter greater than that of the hubs 74, whereby fluid communication may be established between the openings 98 and the fluid receiving spaces 86.

In operating the capacitance cell for monitoring the dielectric constant of a flow stream of fluid, the intake nipple 18 is attached to a supply line and the nipple 22 is attached to a discharge line. A flow stream of fluid is established through the chamber 12 and across the submerged electrode structure, the fluid filling the spaces 86 between the plates 34, 36 and 38. When the spindle structure 24 and the plates are rotated in a clockwise direction, as viewed from the lower end of Fig. 1, fluid is drawn into the spaces 86 through the openings 98 in the plates 34 and 38 and is subsequently rapidly ejected from the open outer ends of the spaces 86 by the action of centrifugal force imparted by the rotating plates and the action of the curved legs 76 which operate as a plurality of impellers and aid in ejecting the fluid from the spaces.

In addition, the reverse curvature of the legs 76 with respect to the direction of rotation aids in preventing the unwanted accumulation of matter along the side edges 84 of the legs defining the fluid receiving spaces. The holes 94 in the center plate 36 permit fluid communication axially through the electrode structure and between the fluid receiving spaces 86 should there be any asymmetry in the flow conditions.

From the foregoing it is apparent that during the operation of the capacitance cell, the surfaces of the plates are swept clean of any foreign matter, air bubbles, water globules, etc. which may be entrained in the fluid being tested. Thus, any variation in the capacitance indicated by the recorder 58 is due to the presence of impurities in or a change in the properties of the fluid being tested and is therefore a measure of variations in the dielectric constant of the fluid.

Where the measuring cell is used for the specific purpose of measuring the water content of an oil such, for example, as a fuel oil, a reference capacitance cell can be used with the capacitance measuring apparatus in order to be able to correct for variations in the dielectric constant of different base oils from which the fuel is derived. By using, for example, a bridge circuit the ratio of the capacitances of the reference cell and the measuring cell can be measured directly. The reference cell is filled with dry oil from the same source as the possibly wet oil which is passed through the measuring cell.

If it is desired to make an absolute determination of the dielectric constant of a liquid or gas, the nipples 18 and 22 are plugged and separate measurements of the capacitance of the cell are made with two fluids of known dielectric constant used as the dielectric of the cell. Subsequently the capacitance of the cell is measured with the liquid or gas as the dielectric. From these measurements the dielectric constant of the liquid or gas can be determined. The calibrating measurements need only be performed initially, and possibly at intervals as a check, provided that the results are recorded.

The capacitance cell of the present invention is particularly useful in monitoring a flow stream of fluid since it can be accurately operated for extended periods of time. The present construction permits the spacing between the plates to be made small without reducing the accuracy of the cell due to the collection of foreign matter, etc. on the plates. The result is that, for a given plate size, the capacitance is increased, and with it the change in capacitance for a given change in dielectric constant, whereby the effects of any stray capacitance in the recording circuit are reduced. Moreover, the construction of the condenser enables it to be readily modified by adding more plates to increase the capacitance or, if desired, by reducing the number of plates to two to simplify the apparatus. However, the structure shown in Fig. 1, wherein the two outer plates 34 and 38 are preferably earthed, has been found to be particularly advantageous. When three or more plates are used the two outer plates are preferably connected to the same conductor and earthed to reduce the effects of external influences on the cell. This may be done in any suitable manner such, for example, as by electrically connecting the brush type contact 70 to the metal arm which is attached to the casing 14 and carries the contacts 70 as shown.

I claim as my invention:

1. A capacitance cell for measuring the dielectric constant of a fluid comprising: means defining a chamber for receiving a sample of the fluid, a rotatable spindle structure having a portion disposed within said chamber, at least two condenser plates carried by said spindle structure portion and rotatable therewith about the axis of said spindle structure, insulating spacer means arranged between said plates, said means having a plurality of radially extending legs forming a plurality of radial spaces between the plates to receive the fluid under measurement as a dielectric, insulated conductor means comprising said spindle structure for electrically connecting said plates to a measuring bridge, and means for rotating said spindle structure.

2. A capacitance cell for monitoring the dielectric constant of a flow stream of fluid comprising: means defining a chamber having a fluid intake opening and a fluid discharge opening whereby a flow stream of the fluid can be established through the chamber, a rotatable spindle structure disposed within said chamber, motor means for rotating said spindle structure, a pair of condenser plates carried by said spindle structure and arranged for rotation therewith in the path of the flow stream and about the axis of said spindle structure, axial insulated spacer means disposed between said plates, said spacer means having a plurality of radially extending legs forming a plurality of radial spaces adapted to receive the fluid as a dielectric of a condenser, said plates having openings whereby fluid communication can be established through the plates with said spaces, said legs being disposed in the same plane and being curved in a direction opposite to that of the rotation of the plates thereby aiding in ejecting outwardly from said spaces the fluid and foreign matter carried thereby during operation of the capacitance cell, and insulated conductor means comprising said spindle structure for electrically connecting said plates to a measuring bridge.

3. A condenser comprising: a spindle structure having one end adapted to be connected to a motor for rotating said structure, three condenser plates carried by said spindle structure and rotatable therewith about the axis of said spindle structure, said plates being axially spaced from said one end of the spindle structure and being electrically insulated and axially spaced from each other, insulator spacer means disposed between said plates, said spacer means having a plurality of radially extending legs forming a plurality of radial spaces adapted to receive a fluid as a dielectric of a condenser, said plates having openings whereby fluid communication can be established through the plates with said spaces, at least two insulated conductors comprising a part of said spindle structure, one of said conductors being electrically connected to an intermediate one of said plates and the other of said conductors being electrically connected to the two outer plates.

4. A condenser comprising: a spindle structure having one end adapted to be connected to a motor for rotating said structure, at least two condenser plates carried by said spindle structure and rotatable therewith about the axis of said spindle structure, said plates being axially spaced from said one end of the spindle structure and being electrically insulated and axially spaced from each other, insulated spacer means disposed between said plates, said spacer means having a plurality of radially extending legs forming a plurality of radial spaces adapted to receive a fluid as the dielectric of a condenser, said plates having openings whereby fluid communication can be established through the plates with said spaces, a pair of slip rings insulated from each other and carried by said spindle structure, and at least two insulated conductors comprising a part of said spindle structure, one of said conductors being electrically connected between one of said plates and one of said slip rings and the other of said conductors being electrically connected between the other plate and the other slip ring.

References Cited in the file of this patent

UNITED STATES PATENTS

| | | |
|---|---|---|
| 1,999,319 | Dowling | Apr. 30, 1935 |
| 2,255,053 | Gunn | Sept. 9, 1941 |
| 2,349,992 | Schrader | May 30, 1944 |